United States Statutory Invention Registration [19]

[11] Reg. Number: H481

Filardo et al.

[43] Published: Jun. 7, 1988

[54] MICROPROCESSOR CONTROLLED RF MODULATOR APPARATUS

[75] Inventors: Francis X. Filardo, Shalimar; Michael C. Scott, Panama City, both of Fla.

[73] Assignee: The United States of America as represented by the Secretary of the Air Force, Washington, D.C.

[21] Appl. No.: 793,811

[22] Filed: Nov. 1, 1985

[51] Int. Cl.[4] ..... G01S 900

[52] U.S. Cl. ..... 342/170; 434/2

[58] Field of Search ..... 343/17.7; 434/2; 342/169, 170

[56] References Cited

U.S. PATENT DOCUMENTS

| | | | |
|---|---|---|---|
| 3,571,479 | 3/1971 | Horattas | 35/10.4 |
| 3,718,988 | 3/1973 | Ball et al. | 434/2 |
| 3,783,172 | 1/1974 | Bernstein | 35/10.4 |
| 3,792,475 | 2/1974 | Smetana | 343/17.7 |
| 4,168,502 | 9/1979 | Susie | 343/17.7 |
| 4,224,583 | 9/1980 | Larkin | 333/100 |
| 4,327,417 | 4/1982 | Zaczek | 364/578 |
| 4,334,866 | 6/1982 | Burrows | 343/17.7 X |
| 4,450,447 | 5/1984 | Zebker et al. | 343/17.7 |
| 4,493,647 | 1/1985 | Cowdrey | 434/2 |

*Primary Examiner*—Stephen C. Buczinski
*Assistant Examiner*—Linda J. Wallace
*Attorney, Agent, or Firm*—William Stephanishen; Donald J. Singer

[57] ABSTRACT

The microprocessor-controlled RF modulator apparatus will provide repeatable, controlled scintillation on a test bench generated low-power RF target waveforms for the purpose of providing a target returns with realistic radar cross section characteristics during testing of the F-16 (or any other) fire control radar. The microprocessor-controlled RF modulator apparatus is utilized in line between an RF target signal generator and the target horn to provide a variety of target situations for testing radar hardware and software.

7 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MICROPROCESSOR CONTROLLED RF MODULATOR APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to an RF modulator apparatus, and in particular to a microprocessor-controlled RF modulator apparatus.

The state of the art of radar target signal simulators is well represented and alleviated to some degree by the prior arts apparatus and approaches which are contained in the following U.S. Patents:

U.S. Pat. No. 3,571,479 issued to Horattas et al on Mar. 16, 1971;

U.S. Pat. No. 3,783,172 issued to Bernstein on Jan. 1, 1974;

U.S. Pat. No. 3,792,475 issued to Smetana on Mar. 9, 1972;

U.S. Pat. No. 4,168,502 issued to Susie on Mar. 15, 1978;

U.S. Pat. No. 4,224,583 issued to Larken on Nov. 29, 1978; and

U.S. Pat. No. 4,327,417 issued to Zaczek on June 6, 1980.

The early prior art approach to radar target generation or simulation is shown in the prior art patents of Horattas et al and Bernstein. The Horattas et al patent is directed toward a digital electronic target generator wherein digitized radar targets are stored in a memory matrix where range is "bit" oriented and aximuth is "word" oriented. Each word in the matrix represents an azimuth line segment of a target on a radar display and the bit position within a matrix word represents the target range, each bit being the smallest range unit defined by the resolution of the display. A computer identifies the location of all targets in the display matrix and transfers the data to parallel-to-serial shift registers which output serial pulse trains representative of the target words. An output signal having analog characteristics is produced by summing the shift register output results and may be used in a simulator visual display.

The Berstein patent comprises a radar simulator apparatus which utilizes a general-purpose digital computer and a special interface which generates suitable video signals in response to the computer outputs to drive a radar set. In a radar simulator in which several different types of radar targets are simulated, the apparatus of this invention is used to generate the video signals which will display a plurality of mobile targets on the radar set. A limited number of such targets are displayed, and the characteristics of these targets are entered into the computer. Information representing the initial locations of the selected targets and their directions and speeds of movement is inserted into the computer from a remote station, and the computer performs the necessary navigational computations to continually determine the location of the radar set in the gaming area, the bearing of each of the targets from the radar set, and the bearing of the radar antenna at any time. The ranges of all of the targets on a particular bearing are entered by the computer into a register in the order of increasing range from the radar set. When the simulated radar antenna bearing agrees with the target bearing, the stored target ranges are read from the register and are converted into video signals to drive the radar set.

The Smetana, Zaczek and Susie patents respectively illustrate the present day approach of prior art target signal simulators which have been either extremely complicated in that they were controlled by a digital computer or limited to producing signals useful in testing short range or low PRF radar systems. The computer based systems were complicated due to the extensive programming which is required to generate the delays that correspond to the range of the simulated target and to calculate the pulse repetition frequency of the simulated target signal. The limited range of the simulators which did not use digital computers, resulted primarily from the fact that they provided no convenient means for generating a simulated target signal in which the time interval between adjacent pulses of the signal was less than the transit time to and from the simulated target.

The Larkin patent presents another novel approach to the field of radar target signal simulation through the use of a linear attenuator which uses a dc control current to change the RF resistance of PIN diodes that are in series and parallel with the load. As the control current changes, the RF resistance of the series diode will vary inversely, while the RF resistance of the parallel diode will vary directly thereby providing attenuation which changes linearly as a function of the control current through the series diode. The present invention is directed to a microprocessor-controlled RF modulator apparatus which provides RF target return signals to a fire control radar with realistic radar characteristics.

SUMMARY OF THE INVENTION

The present invention utilizes a microprocessor which is controllable in both attenuation range and frequency to amplitude modulate a test bench generated radar target return signal. The radar characteristic of the target are varied with respect to aspect angle, radar cross section and other physical parameter to provide a non-stable, time/amplitude varying signal which is representative of a true radar target.

It is one object of the present invention, therefore, to provide an improved microprocessor-controlled RF modulator apparatus.

It is another object of the invention to provide an improved microprocessor-controlled RF modulator apparatus that will generate repeatable, controlled scintillation to low-power waveforms.

It is another object of the invention to provide an improved microprocessor-controlled RF modulator apparatus with a realistic target simulation since the received target signal is amplitude modulated by the microprocessor unit.

It is another object of the invention to provide an improved microprocessor-controlled RF modulator apparatus which is controllable in both attenuation range and frequency.

It is another object of the invention to provide an improved microprocessor-controlled RF modulator apparatus wherein the degree of modulation can be controlled within minimum and maximum levels.

It is another object of the invention to provide an improved microprocessor-controlled RF modulator apparatus that generates a non-stable varying target return signal which is representative of a true air-to-air target.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
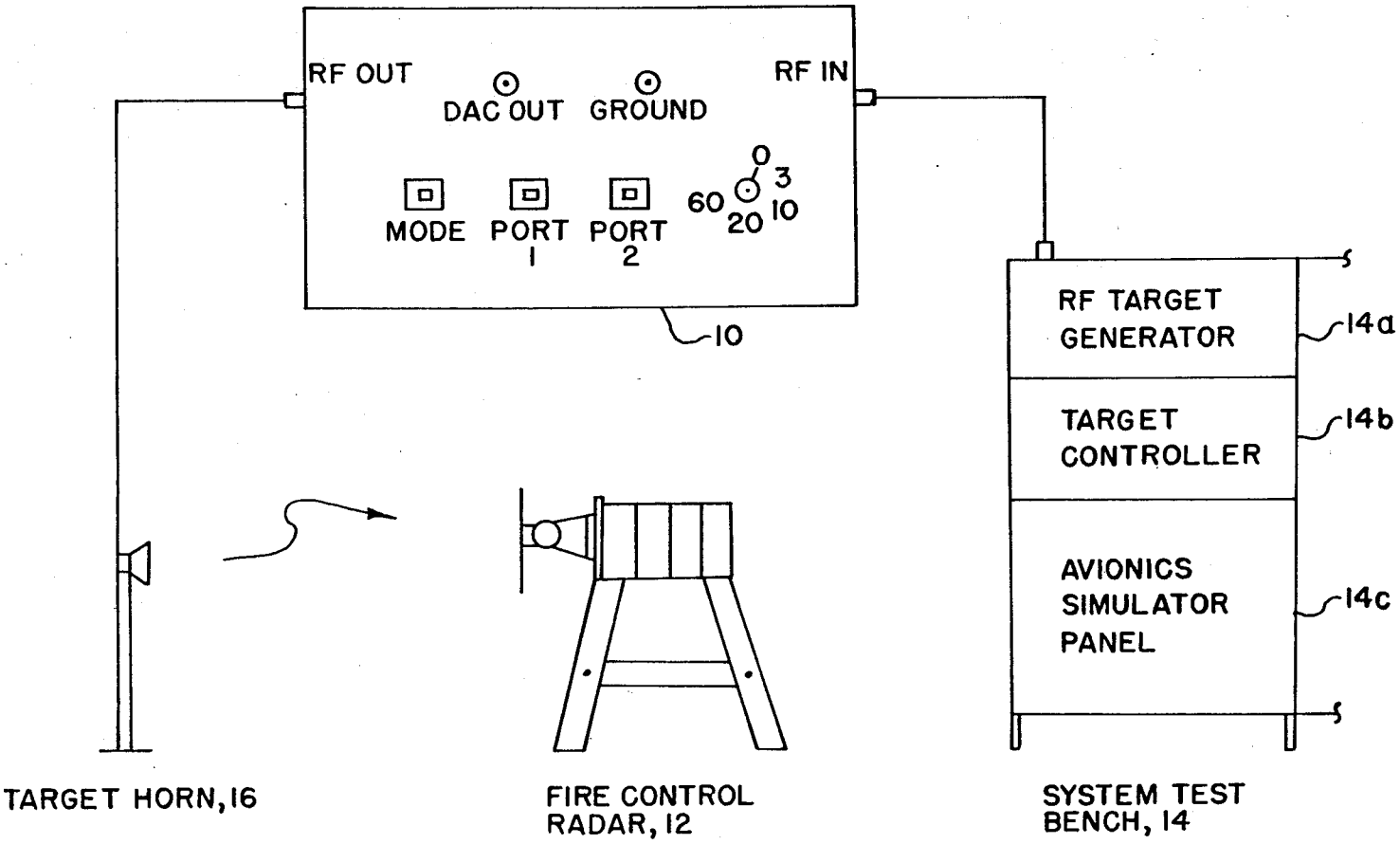
FIG. 1 is a block diagram illustrating the use of the microprocessor-controlled RF modulator apparatus in a standard test set-up.

Turning now to FIG. 1 there is shown a block diagram of a standard test set-up utilizing the microprocessor-controlled RF modulator apparatus 10 for testing a fire control radar unit 12. The system test bench unit 14 typically comprises an RF target generator unit **14*a*, a target controller unit 14*b* and an avionics simulator panel unit 14*c*. The test bench generated target signal is applied to the microprocessor-controlled RF modulator apparatus 10 wherein it is amplitude modulated and is controlled in both frequency and attenuation range. The modulated RF target return signal from the microprocessor-controlled RF modulator apparatus 10 is applied to the target horn 16. The target horn 16 is arranged to transmit the modulated RF target return signal to the fire control radar unit 12** which is under test.

Figure 2:
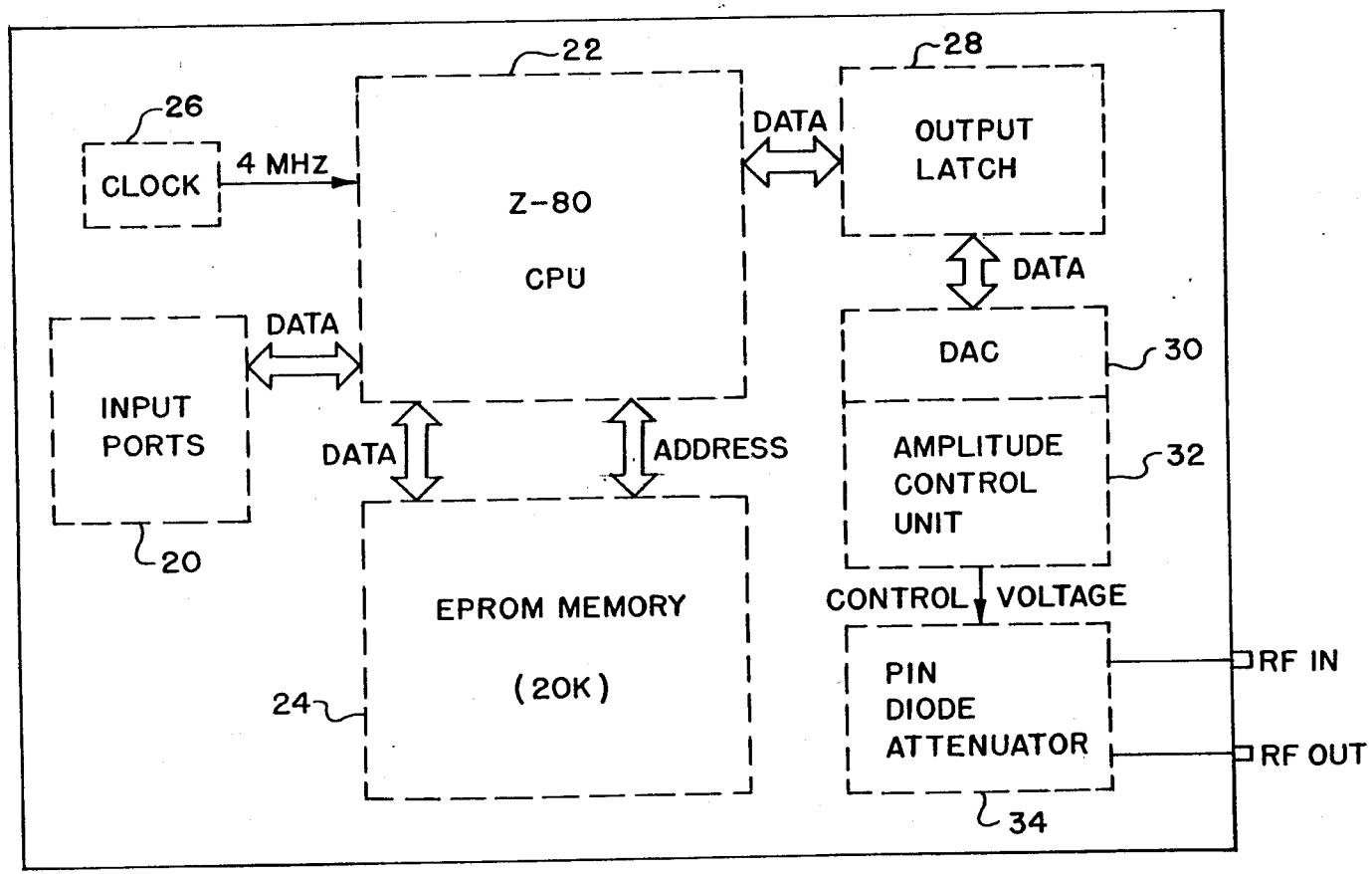
FIG. 2 is a block diagram of the microprocessor-controlled RF modulator apparatus according to the present invention.

The microprocessor-controlled RF modulator apparatus will provide repeatable, controlled scintillation to low-power RF waveforms for the purpose of testing the F-16 or any other fire control radar. The microprocessor-controlled RF modulator apparatus 10 is shown in FIG. 1 as installed in line between an RF target generator unit 14a and a target horn unit 16 to provide many added capabilities for testing the hardware and software of a fire control radar unit. This apparatus provides the user with a most realistic target simulation since the received target signal is amplitude modulated by the Z-80 microprocessor (which is shown in FIG. 2) and is controllable in both attenuation range and frequency. The scintillation (modulation) that can be provided can be square wave, swept square wave, triangle wave, sine wave or repeatable random noise at a number of frequencies and, in the case of the square wave functions, at a number of duty factors. The type of modulation, the frequency of the modulation and the duty factor are selected by setting the mini-lever switches which are respectively labelled Mode, Port 1 and Port 2 on the front panel of the microprocessor-controlled RF modulator apparatus. An operator may also control the degree of modulation by selecting the desired attenuation level with the Attenuation knob on the front panel. The minimum and maximum attenuation levels comprise a range of 0 to 60 db in steps of 0, 3, 10, 20, or 60 db.

A most effective use of the microprocessor-controlled RF modulator apparatus here at the Westinghouse Defense Center is to provide this controlled scintillation to a target signal that is generated by the F-16 system test bench. Now, instead of having the AN-/APG-66 Fire Control Radar search, acquire and track a non-varying, non-oscillating, artificial target, the F-16 radar unit which is under test, must now respond to a simulated target signal whose generated aspect angle, radar cross section and physical characteristics are changing in a most realistic way. The amplitude modulation or scintillation, that is applied to the F-16 system test bench-generated RF target signal, provides a non-stable, varying RF target signal return which is a better representation of a true air-to-air target.

The versatility of the microprocessor-controlled modulator apparatus is especially evident in jamming scenarios since the radar no longer has a steady and solid target to detect and track, but instead, has to detect a target signal that is oscillating or modulating in the presence of a threat environment. This type of testing is valuable since, with the use of the microprocessor-controlled RF modulator apparatus, realistic target returns can be processed in the radar in both ECM and non-ECM environments.

Turning now to FIG. 2 there is shown a block diagram of the microprocessor-controlled RF modulator apparatus. Input ports unit 20 is operatively connected to the data select means which is not shown in FIG. 2 but is shown in FIG. 1 as the minilever switches that are labelled, Mode, Port 1 and Port 2. The input ports unit 20 which is connected to the Z-80 microprocessor unit 22 communicates the switch settings that control the output waveform parameters to the Z-80 central processor unit (CPU) 22. The Z-80 CPU unit 22 receives a 4 MHz clock signal from clock unit 26. An EPROM memory unit 24 which is a 20K memory unit is operatively connected to the Z-80 CPU unit 22. The EPROM memory unit 24 stores the waveform data and parameters which are utilized by the Z-80 CPU unit 22 to generate the simulated radar target test signal. The digital data which represents the radar target test signal is applied through output latch unit 28 to the digital to analog (DAC) unit 30 for conversion to an analog signal. The analog signal from the DAC unit 30 is applied to the amplitude control unit 32 which in response thereto generates a control voltage signal. The pin diode attenuator unit 34 utilizes the control voltage signal to modulate and structure the RF in signal into the selected waveform shape which becomes the RF out signal.

Figure 3:
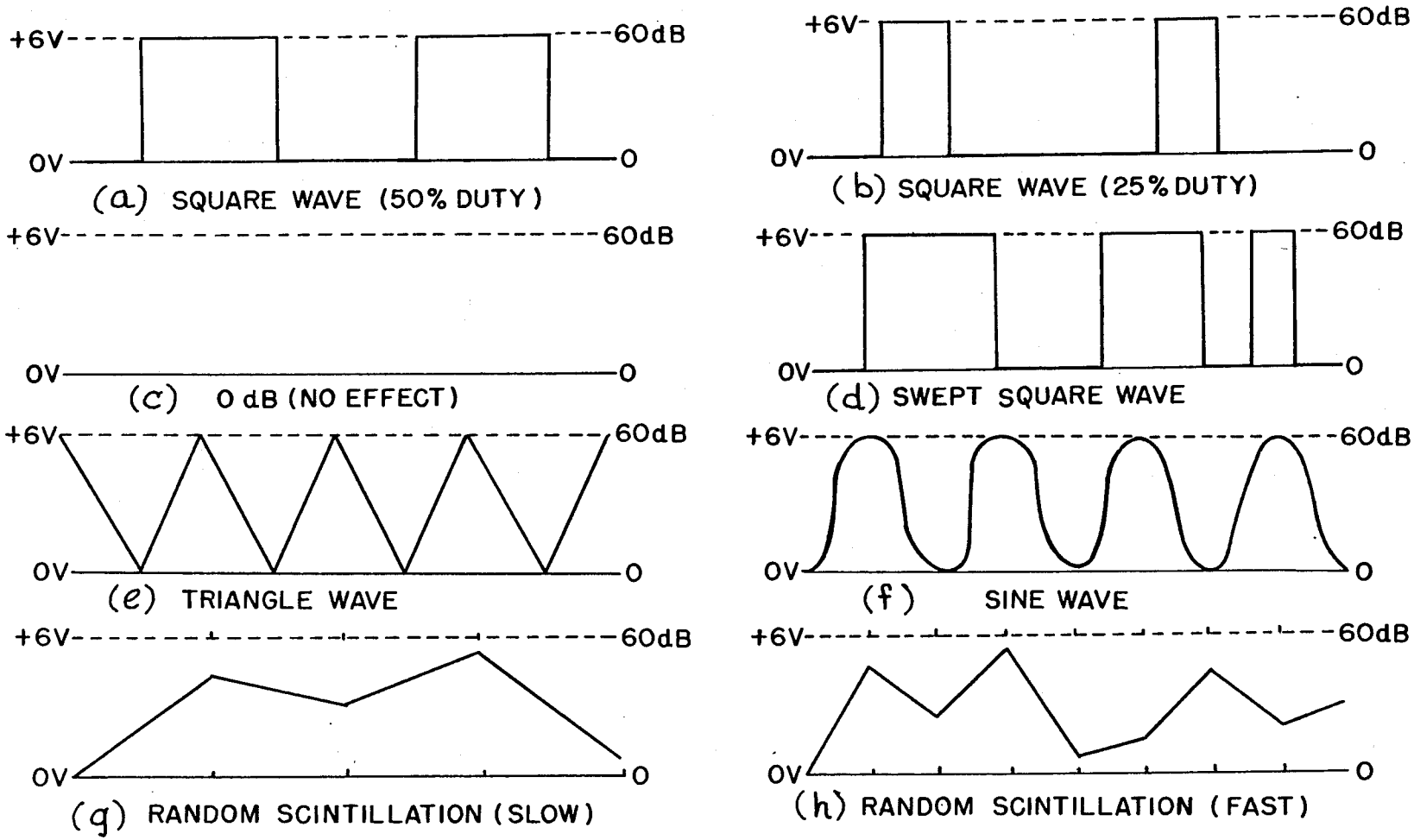
FIG. 3 is a graphical representation of a variety of sample modulation waveforms.

The microprocessor-controlled RF modulator apparatus utilizes the Z-80 CPU and its associated hardware and software to control the RF input signal that is received by the PIN diode unit. The PIN diode unit comprises a General Microwave D1958 PIN diode attenuator unit that provides a linear correspondence between a control voltage (0–6 VDC) and attenuation (0–60 dB). This control voltage which is converted to an analog signal by the digital analog converter unit and the amplitude control unit is the product of the microprocessor outputs and/or stored PROM memory data. Typical control voltage waveforms which may be generated by the microprocessor-controlled modulator apparatus are shown in FIG. 3 and are labelled (a) through (h). In Table I below there is shown the switch positions which provide the logic code to the Z-80 CPU to generate the digital signal that represents a particular output waveform.

TABLE I

The switch logic positions for the microprocessor-controlled RF modulator apparatus is shown as follows:

| Mode | Port 1 | Port 2 | Result |
|---|---|---|---|
| 0 | X | X | Not used |
| 1 | X | X | 0 dB Attenuation |
| 2 | 0 | X | RANDOM DATA - 125 Hz Switching Freq. |
| | 1 | X | RANDOM DATA - 80 Hz |
| | 2 | X | RANDOM DATA - 45 Hz |
| | 3 | X | RANDOM DATA - 20 Hz |
| | 4 | X | RANDOM DATA - 15 Hz |
| | 5 | X | RANDOM DATA - 2 Hz |
| | 6 | X | RANDOM DATA - 1 Hz |
| | 7 | X | RANDOM DATA - .5 Hz |
| 3 | 0 | X | 6 Hz SQUARE |
| | 1 | X | 35 Hz SQUARE |
| | 2 | X | 80 Hz SQUARE |
| | 3 | X | 150 Hz SQUARE |
| | 4 | X | 180 Hz SQUARE |
| | 5 | X | 250 Hz SQUARE |
| | 6 | X | 350 Hz SQUARE |
| | 7 | X | 650 Hz SQUARE |
| | X | 0 | 97.5% Duty SQUARE |
| | X | 1 | 88.0% Duty SQUARE |
| | X | 2 | 73.0% Duty SQUARE |
| | X | 3 | 50.0% Duty SQUARE |
| | X | 4 | 27.0% Duty SQUARE |
| | X | 5 | 12.0% Duty SQUARE |
| | X | 6 | 2.5% Duty SQUARE |
| 4 | X | X | 28.6–80 Hz SWEPT SQUARE in 2 seconds |
| 5 | 0 | X | .5 Hz SINE |
| | 1 | X | 2 Hz SINE |
| | 2 | X | 12 Hz SINE |
| | 3 | X | 24 Hz SINE |
| | 4 | X | 28 Hz SINE |
| | 5 | X | 55 Hz SINE |
| | 6 | X | 110 Hz SINE |
| | 7 | X | 220 Hz SINE |
| 6 | 0 | X | 2 Hz TRIANGLE |
| | 1 | X | 10 Hz TRIANGLE |
| | 2 | X | 20 Hz TRIANGLE |
| | 3 | X | 40 Hz TRIANGLE |
| | 4 | X | 50 Hz TRIANGLE |
| | 5 | X | 83 Hz TRIANGLE |
| | 6 | X | 125 Hz TRIANGLE |
| | 7 | X | 167 Hz TRIANGLE |
| 7 | X | X | Not used |

(Note: X indicates that the switch position doesn't matter.)

The microprocessor is an eight-bit, 40-pin device, which is operated by a 4 MHz clock and uses 20K of programmed data that is stored on ten (10) 2K EPROM memory chips. The remainder of the circuitry of the microprocessor-controlled RF modulator apparatus controls the buffering of the address and data lines, the I/O circuitry, and provides the gain and impedence matching which is required to drive the PIN diode attenuator.

In FIGS. 4 through 7, there is shown a complete schematic diagram of the microprocessor-controlled RF modulator apparatus wherein similarly designated points are commonly connected. The parts list for the schematic diagram of FIGS. 4 through 7 is given in Table 2 as follows:

TABLE 2

| | |
|---|---|
| 1 - | Z-80 Microprocessor (Zilog) |
| 1 - | 7406 MED |
| 1 - | 74145 MED |
| 6 - | 74244 MED |
| 2 - | 74243 MED |
| 1 - | 4 MHz oscillator |
| 10 - | 2716 EPROMs Intel Corp., |
| 1 - | 74100 MED |
| 1 - | DAC |
| 1 - | PIN Diode Attenuator (Gen. Microwave D1958) |
| 3 - | Minilever Switches |
| 1 - | 7400 MED |
| 1 - | 3P2T switch |
| 1 - | 2PIT momentary switch |
| 2 - | 741 Op-amp MED |
| 1 - | 5P wafer switch |
| 2 - | 0–20K trim pots |
| 2 - | 10K, ⅛ W resistor |
| 1 - | 400 ohm, ⅛ W resistor |
| 1 - | 22 ohm, ⅛ W resistor |
| 1 - | 82 ohm, ⅛ W resistor |
| 1 - | 220 ohm, ⅛ W resistor |
| 23 - | 330 ohm, ⅛ W resistor |

Figure 4:
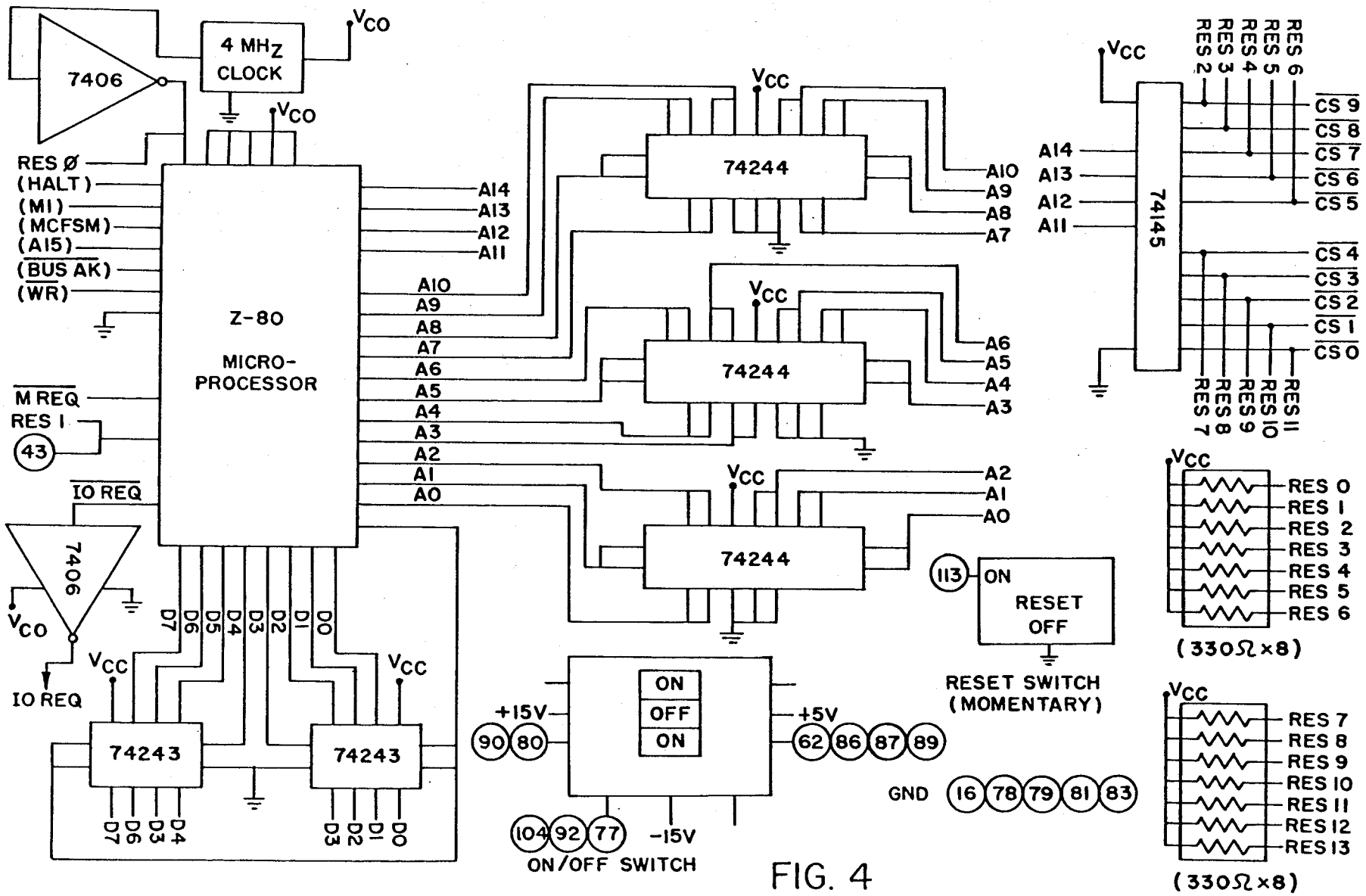
FIG. 4 is a schematic diagram of the Z-80 central processor unit.
Figure 5:
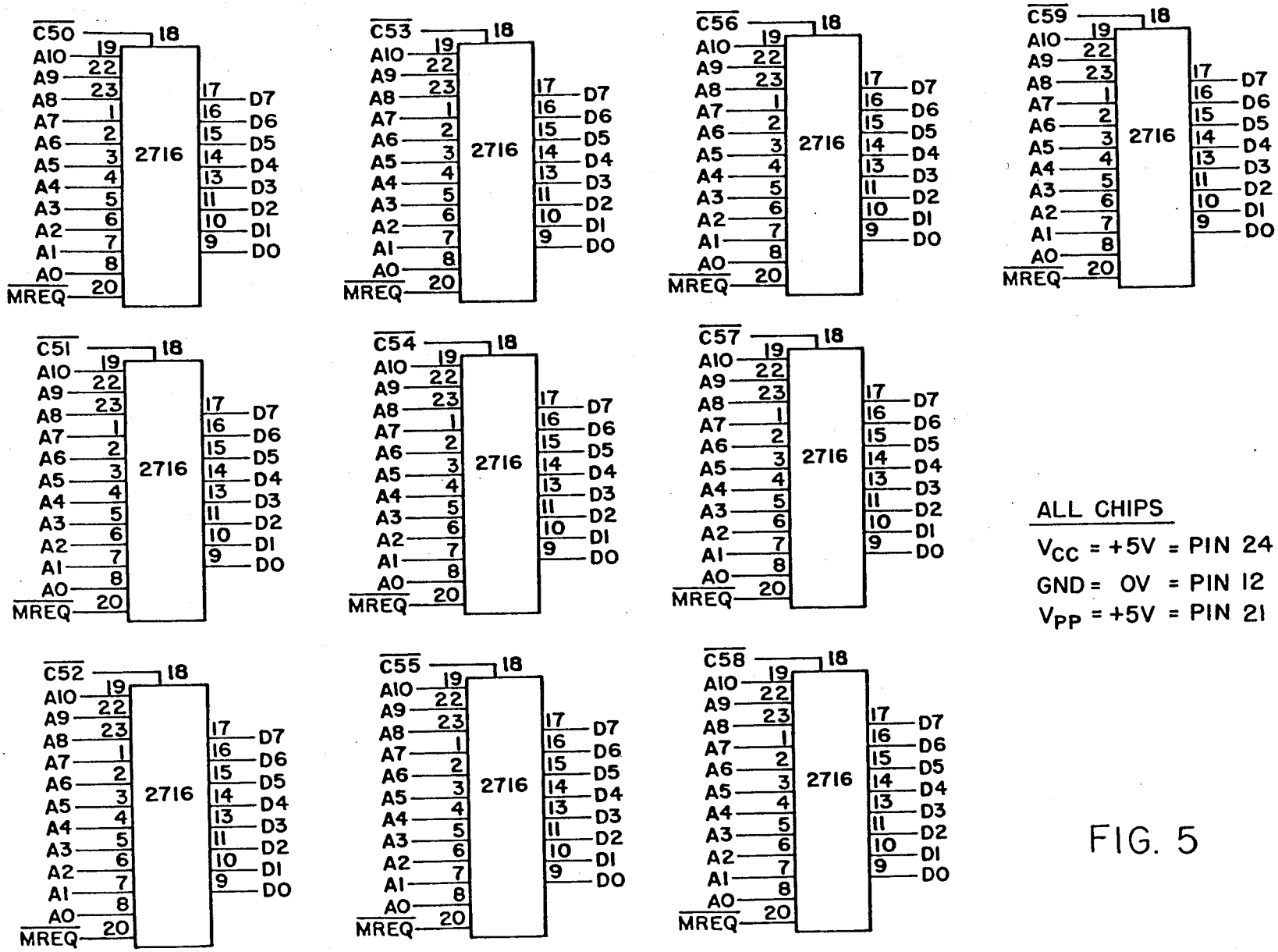
FIG. 5 is a schematic diagram of the 20K EPROM, memory unit.
Figure 6:
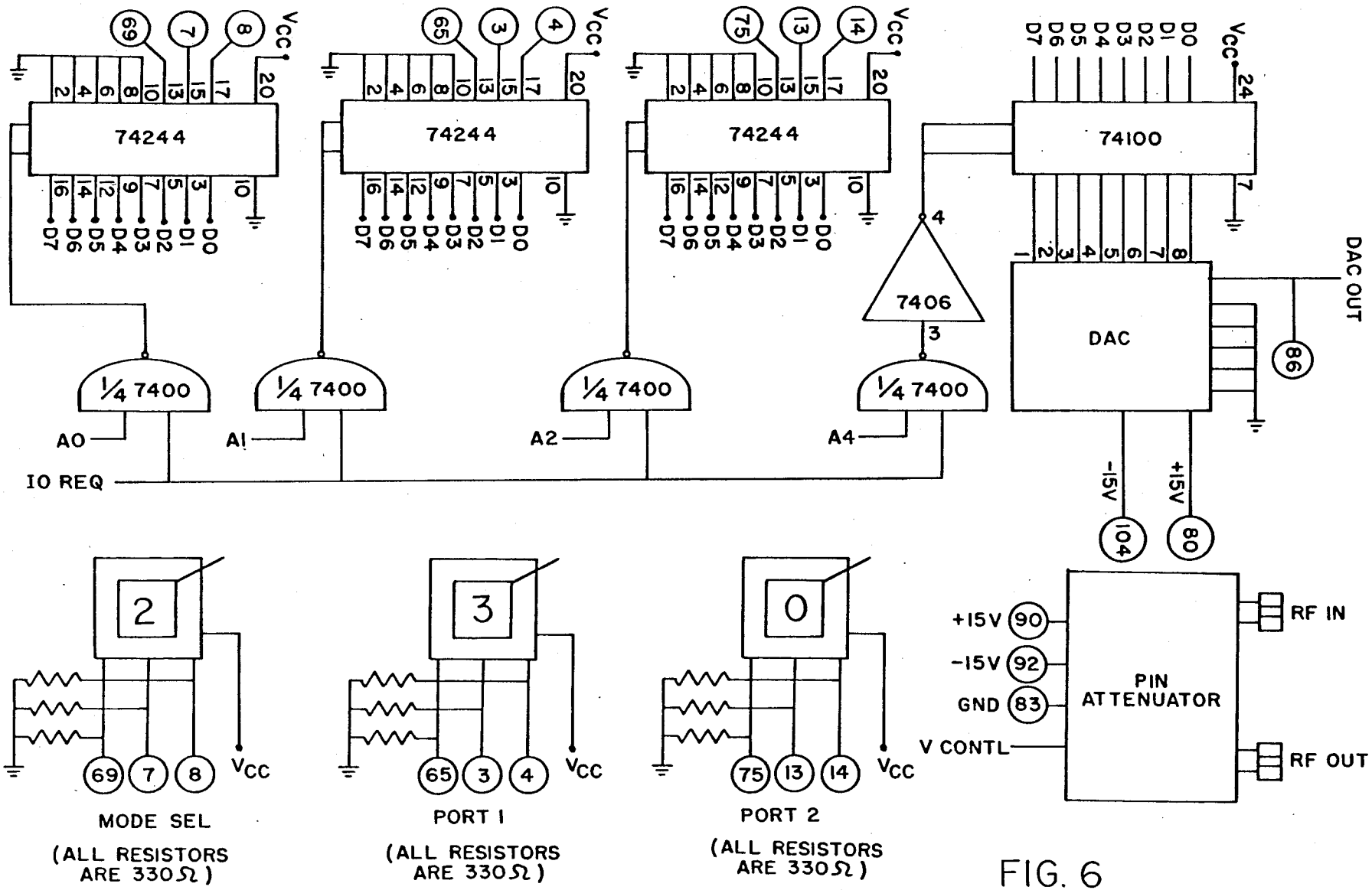
FIG. 6 is a schematic diagram of the output latch unit and the digital to analog converter (DAC) unit, and, FIG. 7 is a schematic diagram of the PIN diode attenuator unit.
Figure 7:
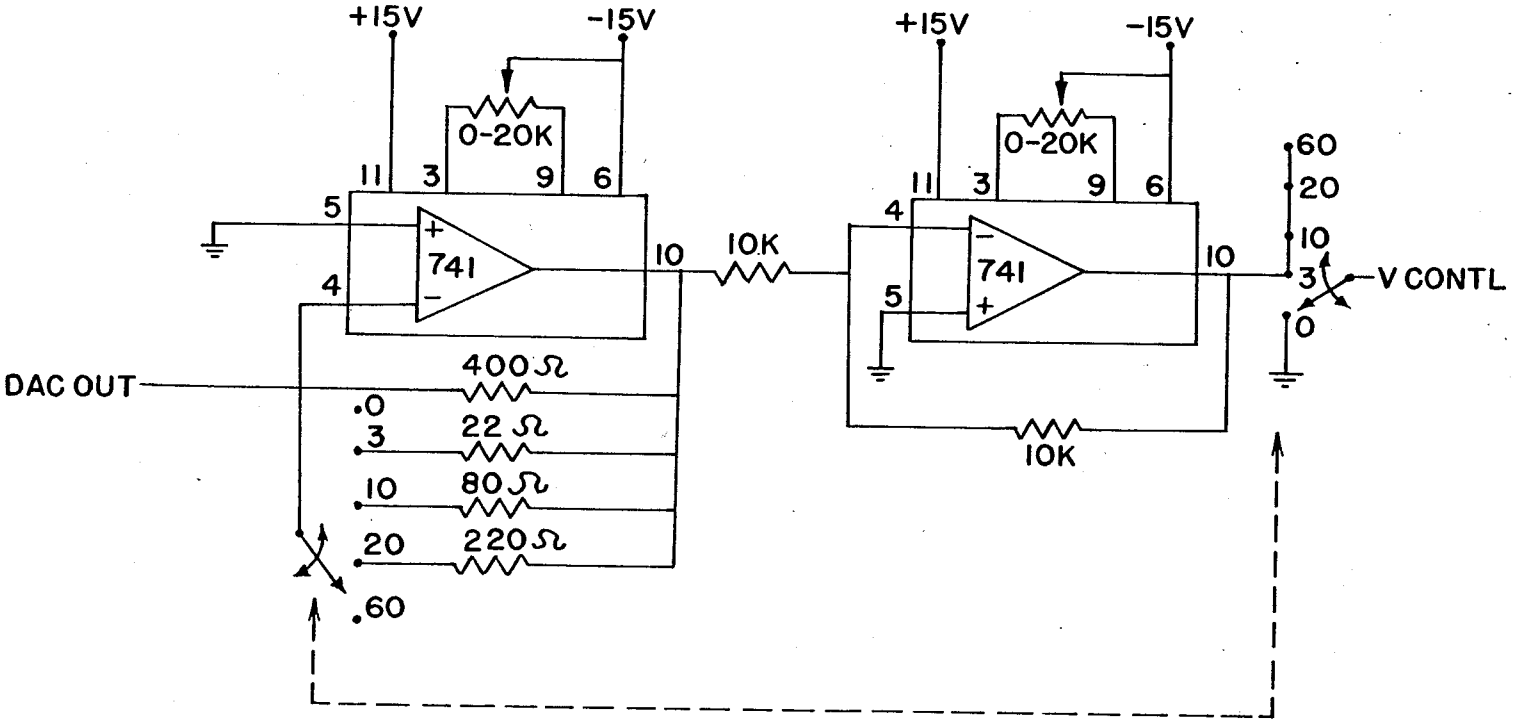

In FIG. 4 there is shown a schematic diagram of the Z-80 microprocessor (CPU) and its associated circuitry. The elements of FIG. 4 can be related to the block diagram of FIG. 2 as follows. The Z-80 CPU of FIG. 2 comprises Z-80 microprocessor unit, the data line buffer units (74243); the address line buffer units (74244); the demultiplexer unit (74145) and its associated resistor array. In FIG. 5 there is shown the 20K EPROM memory unit which comprises ten 2K EPROM units (2716). In FIG. 6 there is shown the input ports unit of FIG. 2 which comprises the three minilever switches (Mode Sel, Port 1 and Port 2), the address line buffer units (74244) and the NAND gates (7400) which are associated with the buffer units. In FIG. 6 there is also shown the output latch unit of FIG. 2 which comprises the output latch unit (74100), the digital to analog converter unit (DAC) and the PIN diode attenuator. In FIG. 7 there is shown the amplitude control unit of FIG. 2 which comprises a pair of operational amplifier units (741) and its associated circuitry that includes a five position wafer switch as shown.

A desirable feature of the present apparatus is its programmability. The entire operation of the microprocessor-controlled RF modulator apparatus can be modified by changing the program of the EPROMs. The hardware does not need to be modified at all. The microprocessor-controlled RF modulator apparatus is rack-mountable and uses +5 V, +15 V and −15 V DC power.

The program memory is mapped as follows:

| | | |
|---|---|---|
| 0000H–07FFH | (2K) | Program Executive |
| 0800H–08FFH | (1K) | Sine Wave Simulation |
| 0C00H–OFFFH | (1K) | Unused |
| 1000H–4FFFH | (16K) | Random Noise Simulation |

TABLE 3

| ER LINE | ADDR | B1 | B2 | B3 | B4 | Z80 ASSEMBLER I.L.S.O. |
|---|---|---|---|---|---|---|
| 1 | | | | | | ;* |
| 2 | | | | | | ; MICROPROCESSOR CONTROLLED RF ATTENUATOR |
| 3 | 0000 | 00 | | | | NOP |
| 4 | 0001 | 00 | | | | NOP |
| 5 | 0002 | 00 | | | | NOP |
| 6 | 0003 | 00 | | | | NOP |

TABLE 3-continued

| | | | | | | | | |
|---|---|---|---|---|---|---|---|---|
| 7 | 0004 | 00 | | | | | NOP | |
| 8 | 0005 | 00 | | | | | NOP | |
| 9 | 0006 | 00 | | | | | NOP | |
| 10 | 0007 | 00 | | | | | NOP | |
| 11 | 0008 | 00 | | | | | NOP | |
| 12 | 0009 | 00 | | | | | NOP | |
| 13 | 000A | DB | 01 | | | START | IN | A,(1) |
| 14 | 000C | 3D | | | | | DEC | A |
| 15 | 000D | CA | 34 | 00 | | | JP | Z,0DB |
| 16 | 0010 | 3D | | | | | DEC | A |
| 17 | 0011 | CA | F7 | 01 | | | JP | Z,SAMPLE |
| 18 | 0014 | 3D | | | | | DEC | A |
| 19 | 0015 | CA | 1C | 01 | | | JP | A,SQW |
| 20 | 0018 | 3D | | | | | DEC | A |
| 21 | 0019 | CA | 83 | 00 | | | JP | Z,SWP |
| 22 | 001C | 3D | | | | | DEC | A |
| 23 | 001D | CA | 3B | 00 | | | JP | Z,SINE |
| 24 | 0020 | 3D | | | | | DEC | A |
| 25 | 0021 | CA | EE | 00 | | | JP | Z,TRW |
| 26 | 0024 | D3 | 02 | | | RNDM | IN | A,(2) |
| 27 | 0026 | DD | 21 | 67 | 01 | | LD | IX,TBL2 |
| 28 | 002A | 21 | FF | 3F | | | LD | HL,3FFFH |
| 29 | 002D | FD | 21 | 00 | 10 | | LD | IY,1000H |
| 30 | 0031 | C3 | 48 | 00 | | | JP | S0 |
| 31 | 0034 | 3E | 00 | | | ODB | LD | A,O |
| 32 | 0036 | D3 | 10 | | | | OUT | (10H),A |
| 33 | 0038 | C3 | 0A | 00 | | | JP | START |
| 34 | 003B | DB | 02 | | | SINE | IN | A,(2) |
| 35 | 003D | DD | 21 | 5F | 01 | | LD | IX,TBL1 |
| 36 | 0041 | 21 | FF | 03 | | | LD | HL,03FFH |
| 37 | 0044 | FD | 21 | 00 | 0B | | LD | IY,0900H |
| 38 | 0048 | 16 | 00 | | | GO | LD | D,O |
| 39 | 004A | 5F | | | | | LD | E,A |
| 40 | 004B | DD | 19 | | | | ADD | IX,DE |
| 41 | 004D | 01 | 01 | 00 | | | LD | BC,1 |
| 42 | 0050 | D6 | 04 | | | | SUB | 4 |
| 43 | 0052 | FA | 50 | 00 | | SKIP | JP | M,CEXT |
| 44 | 0055 | DD | 7E | 00 | | | LD | A, IX) |
| 45 | 0058 | 4F | | | | | LD | C,A1 |
| 46 | 0059 | C3 | 66 | 00 | | | JP | OUT |
| 47 | 0050 | DD | 7E | 00 | | NEXT | LD | A,(IX) |
| 48 | 005F | 3D | | | | LOOP | DEC | A |
| 49 | 0060 | CA | 66 | 00 | | | JP | Z,OUT |
| 50 | 0063 | C3 | 5F | 00 | | | JP | LOOP |
| 51 | 0066 | FD | 7E | 00 | | OUT | LD | A,(IY + 0) |
| 52 | 0069 | D3 | 10 | | | | OUT | (10H),A |
| 53 | 0068 | FD | 09 | | | | ADD | IY,BO |
| 54 | 0060 | ED | 42 | | | | SHC | HL,BC |
| 55 | 006F | FA | 79 | 00 | | | JP | M,CHJZ |
| 56 | 0072 | DB | 02 | | | | IN | A,(2) |
| 57 | 0074 | D6 | 04 | | | | SUB | 4 |
| 58 | 0076 | C3 | 52 | 00 | | | JP | SKIP |
| 59 | 0079 | DB | 01 | | | CHUZ | IN | A,(1) |
| 60 | 0078 | D6 | 05 | | | | SUB | 5 |
| 61 | 0070 | CA | 3B | 00 | | | JP | Z,SINE |
| 62 | 0080 | C3 | 24 | 00 | | | JP | RNDM |
| 63 | 0083 | 01 | 00 | 00 | | SWP | LD | BC,O |
| 64 | 0086 | 3E | FF | | | SWL2 | LD | A,OFFH |
| 65 | 0088 | D3 | 10 | | | | OUT | (10H),A |
| 66 | 008A | 11 | FF | FF | | | LD | DE,−1 |
| 67 | 008D | 21 | 20 | 04 | | | LD | HL,105BD |
| 68 | 0090 | 09 | | | | | ADD | HL,BC |
| 69 | 0091 | 19 | | | | SWL | ADD | HL,DE |
| 70 | 0092 | 38 | FD | | | | JP | C,SWL |
| 71 | 0094 | 00 | | | | | NOP | |
| 72 | 0095 | 00 | | | | | NOP | |
| 73 | 0096 | 00 | | | | | NOP | |
| 74 | 0097 | 00 | | | | | NOP | |
| 75 | 0098 | 00 | | | | | NOP | |
| 76 | 0099 | 00 | | | | | NOP | |
| 77 | 009A | 00 | | | | | NOP | |
| 78 | 009B | 00 | | | | | NOP | |
| 79 | 009C | 00 | | | | | NOP | |
| 80 | 009D | 00 | | | | | NOP | |
| 81 | 009E | 00 | | | | | NOP | |
| 82 | 009F | 00 | | | | | NOP | |
| 83 | 00A0 | 00 | | | | | NOP | |
| 84 | 00A1 | 00 | | | | | NOP | |
| 85 | 00A2 | 00 | | | | | NOP | |
| 86 | 00A3 | 00 | | | | | NOP | |
| 87 | 00A4 | 00 | | | | | NOP | |
| 88 | 00A5 | 00 | | | | | NOP | |

TABLE 3-continued

| | | | | | | | | |
|---|---|---|---|---|---|---|---|---|
| 89 | 00A6 | 00 | | | | | NOP | |
| 90 | 00A7 | 00 | | | | | NOP | |
| 91 | 00A8 | 00 | | | | | NOP | |
| 92 | 00A9 | 00 | | | | | NOP | |
| 93 | 00AA | 00 | | | | | NOP | |
| 94 | 00AB | 00 | | | | | NOP | |
| 95 | 00AC | 00 | | | | | NOP | |
| 96 | 00AD | 00 | | | | | NOP | |
| 97 | 00AE | 00 | | | | | NOP | |
| 98 | 00AF | 00 | | | | | NOP | |
| 99 | 00B0 | 00 | | | | | NOP | |
| 100 | 00B1 | 00 | | | | | NOP | |
| 101 | 00B2 | 00 | | | | | NOP | |
| 102 | 00B3 | 00 | | | | | NOP | |
| 103 | 00B4 | 00 | | | | | NOP | |
| 104 | 00B5 | 00 | | | | | NOP | |
| 105 | 00B6 | 00 | | | | | NOP | |
| 106 | 00B7 | 00 | | | | | NOP | |
| 107 | 00B8 | 00 | | | | | NOP | |
| 108 | 00B9 | 00 | | | | | NOP | |
| 109 | 00BA | 00 | | | | | NOP | |
| 110 | 00BB | 00 | | | | | NOP | |
| 111 | 00BC | 00 | | | | | NOP | |
| 112 | 00BD | 00 | | | | | NOP | |
| 113 | 00BE | 00 | | | | | NOP | |
| 114 | 00BF | 00 | | | | | NOP | |
| 115 | 00C0 | 3E | 00 | | | | LD | A, |
| 116 | 00C2 | D3 | 10 | | | | OUT | (10H),A |
| 117 | 00C4 | 11 | FF | FF | | | LD | DE,−1 |
| 118 | 00C7 | 21 | 20 | 04 | | | LD | HL,1056D |
| 119 | 00CA | 09 | | | | | ADD | HL,BC |
| 120 | 00CB | 19 | | | | SWL1 | ADD | HL,DE |
| 121 | 00CC | 38 | FD | | | | JR | C,SWL1 |
| 122 | 00CE | 0B | | | | | DEC | BC |
| 123 | 00CF | 0B | | | | | DEC | BC |
| 124 | 00D0 | 0B | | | | | DEC | BC |
| 125 | 00D1 | 0B | | | | | DEC | BC |
| 126 | 00D2 | 0B | | | | | DEC | BC |
| 127 | 00D3 | 0B | | | | | DEC | BC |
| 128 | 00D4 | 0B | | | | | DEC | BC |
| 129 | 00D5 | 0B | | | | | DEC | BC |
| 130 | 00D6 | 0B | | | | | DEC | BC |
| 131 | 00D7 | 0B | | | | | DEC | BC |
| 132 | 00D8 | 0B | | | | | DEC | BC |
| 133 | 00D9 | 0B | | | | | DEC | BC |
| 134 | 00DA | 0B | | | | | DEC | BC |
| 135 | 00DB | 0B | | | | | DEC | BC |
| 136 | 00DC | 0B | | | | | DEC | BC |
| 137 | 00DD | 0B | | | | | DEC | BC |
| 138 | 00DE | 0B | | | | | DEC | BC |
| 139 | 00DF | 0B | | | | | DEC | BC |
| 140 | 00E0 | 0B | | | | | DEC | BC |
| 141 | 00E1 | 0B | | | | | DEC | BC |
| 142 | 00E2 | 0B | | | | | DEC | BC |
| 143 | 00E3 | 0B | | | | | DEC | BC |
| 144 | 00E4 | 0B | | | | | DEC | BC |
| 145 | 00E5 | 0B | | | | | DEC | BC |
| 146 | 00E6 | 0B | | | | | DEC | BC |
| 147 | 00E7 | 0B | | | | | DEC | BC |
| 148 | 00E8 | 78 | | | | | LD | A,3 |
| 149 | 00E9 | E6 | 07 | | | | AND | 07 |
| 150 | 00EB | 47 | | | | | LD | B,A |
| 151 | 00EC | 18 | 98 | | | | JP | SWL2 |
| 152 | 00EE | DB | 02 | | | TRW | IN | A,(2) |
| 153 | 00F0 | 57 | | | | | LD | D,A |
| 154 | 00F1 | 06 | 00 | | | | LD | B,O |
| 155 | 00F3 | 4F | | | | | LD | C,A |
| 156 | 00F4 | DD | 21 | 6F | 01 | | LD | IX,TBL3 |
| 157 | 00F8 | DD | 09 | | | | ADD | IX,BC |
| 158 | 00FA | DD | 46 | 00 | | | LD | B,(IX + 0) |
| 159 | 00FD | DB | 02 | | | TL4 | IN | A,(2) |
| 160 | 00FF | BA | | | | | CP | D |
| 161 | 0100 | 20 | EC | | | | JR | NZ,TRW |
| 162 | 0102 | 3E | 00 | | | | LD | A,0 |
| 163 | 0104 | D3 | 10 | | | TL3 | OUT | (10H),A |
| 164 | 0106 | 3C | | | | | INC | A |
| 165 | 0107 | 28 | 06 | | | | JR | Z,TL1 |
| 166 | 0109 | 48 | | | | | LD | C,B |
| 167 | 010A | 0D | | | | TL2 | DEC | C |
| 168 | 010B | 20 | FD | | | | JR | NZ,TL2 |
| 169 | 010D | 18 | F5 | | | | JR | TL3 |
| 170 | 010F | 3E | FF | | | TL1 | LD | A,OFFH |

TABLE 3-continued

| | | | | | | | | |
|---|---|---|---|---|---|---|---|---|
| 171 | 0111 | D3 | 10 | | | TL6 | OUT | (10H),A |
| 172 | 0113 | 3D | | | | | DEC | A |
| 173 | 0114 | 28 | E7 | | | | JR | Z,TL4 |
| 174 | 0116 | 48 | | | | | LD | C,B |
| 175 | 0117 | OD | | | | TLS | DEC | C |
| 176 | 0118 | 20 | FD | | | | JR | NZ,TL5 |
| 177 | 011A | 18 | F5 | | | | JR | TL6 |
| 178 | 011C | DB | 04 | | | SQW | IN | A,(4) |
| 179 | 011E | E6 | 07 | | | | AND | 007H |
| 180 | 0120 | 4F | | | | | LD | C,A |
| 181 | 0121 | DB | 02 | | | | IN | A,(2) |
| 182 | 0123 | E6 | 07 | | | | AND | 007H |
| 183 | 0125 | CB | 27 | | | | SLA | A |
| 184 | 0127 | CB | 27 | | | | SLA | A |
| 185 | 0129 | CB | 27 | | | | SLA | A |
| 186 | 012B | 81 | | | | | ADD | A,C |
| 187 | 0120 | CB | 27 | | | | SLA | A |
| 188 | 012E | 06 | 00 | | | | LD | B,O |
| 189 | 0130 | 4F | | | | | LD | C,A |
| 190 | 0131 | DD | 21 | 77 | 01 | | LD | IX,TBL4 |
| 191 | 0135 | DD | 09 | | | | ADD | IX,BC |
| 192 | 0137 | DD | 56 | 00 | | | LD | D,(IX + 0) |
| 193 | 013A | DD | 5E | 01 | | | LD | E,(IX + 1) |
| 194 | 013D | DB | 02 | | | | IN | A,(2) |
| 195 | 013F | 47 | | | | | LD | B,A |
| 196 | 0140 | 3E | 00 | | | SL5 | LD | A,O |
| 197 | 0142 | D3 | 10 | | | | OUT | (10H),A |
| 198 | 0144 | 7A | | | | | LD | A,D |
| 199 | 0145 | 4A | | | | SL2 | LD | C,D |
| 200 | 0146 | OD | | | | SL1 | DEC | C |
| 201 | 0147 | 20 | FD | | | | JR | NZ,SL1 |
| 202 | 0149 | 3D | | | | | DEC | A |
| 203 | 014A | 20 | F9 | | | | JR | NZ,SL2 |
| 204 | 014C | DB | 02 | | | | IN | A,(2) |
| 205 | 014E | B8 | | | | | CP | B |
| 206 | 014F | 20 | CB | | | | JR | NZ,SQW |
| 207 | 0151 | 3E | FF | | | | LD | A,OFFH |
| 208 | 0153 | D3 | 10 | | | | OUT | (10H),A |
| 209 | 0155 | 7B | | | | | LD | A,E |
| 210 | 0156 | 4B | | | | SL4 | LD | C,E |
| 211 | 0157 | 0D | | | | SL3 | DEC | C |
| 212 | 0158 | 20 | FD | | | | JR | NZ,SL3 |
| 213 | 015A | 3D | | | | | DEC | A |
| 214 | 015B | 20 | F9 | | | | JR | NZ,SL4 |
| 215 | 015D | 18 | E1 | | | | JR | SL5 |
| 216 | 015F | FF | | | | TRL1 | DEFB | OFFH |
| 217 | 0160 | 4C | | | | | DEFB | 04CH |
| 218 | 0161 | 09 | | | | | DEFB | 9H |
| 219 | 0162 | 02 | | | | | DEFB | 2H |
| 220 | 0163 | 01 | | | | | DEFB | 1 |
| 221 | 0164 | 02 | | | | | DEFB | 2 |
| 222 | 0165 | 04 | | | | | DEFB | 4 |
| 223 | 0166 | 08 | | | | | DEFB | 8 |
| 224 | 0167 | 08 | | | | TBL2 | DEFB | 8 |
| 225 | 0168 | 04 | | | | | DEFB | 4 |
| 226 | 0169 | 02 | | | | | DEFB | 2 |
| 227 | 016A | 01 | | | | | DEFB | 1 |
| 228 | 016B | 01 | | | | | DEFB | 1 |
| 229 | 016C | 02 | | | | | DEFB | 2 |
| 230 | 016D | 04 | | | | | DEFB | 4 |
| 231 | 016E | 08 | | | | | DEFB | 3 |
| 232 | 016F | 00 | | | | TBL3 | DEFB | 0 |
| 233 | 0170 | 2E | | | | | DEFB | 46D |
| 234 | 0171 | 16 | | | | | DEFB | 22D |
| 235 | 0172 | 0E | | | | | DEFB | 14D |
| 236 | 0173 | 08 | | | | | DEFB | 3D |
| 237 | 0174 | 04 | | | | | DEFB | 4D |
| 238 | 0175 | 02 | | | | | DEFB | 2D |
| 239 | 0176 | 01 | | | | | DEFB | 1D |
| 240 | 0177 | 21 | | | | TBL4 | DEFB | 33D |
| 241 | 0178 | E1 | | | | | DEFB | 225D |
| 242 | 0179 | 41 | | | | | DEFB | 65D |
| 243 | 017A | C1 | | | | | DEFB | 193D |
| 244 | 017B | 61 | | | | | DEFB | 97D |
| 245 | 017C | A1 | | | | | DEFB | 1610 |
| 246 | 017D | B1 | | | | | DEFB | 129D |
| 247 | 017E | B1 | | | | | DEFB | 129D |
| 248 | 017F | A1 | | | | | DEFB | 161D |
| 249 | 0180 | 61 | | | | | DEFB | 97D |
| 250 | 0181 | C1 | | | | | DEFB | 193D |
| 251 | 0182 | 41 | | | | | DEFB | 65D |
| 252 | 0183 | E0 | | | | | DEFB | 224D |

TABLE 3-continued

| | | | | |
|---|---|---|---|---|
| 253 | 0184 | 20 | DEFB | 32D |
| 254 | 0185 | 00 | DEFB | 0D |
| 255 | 0186 | 01 | DEFB | 1D |
| 256 | 0187 | 0E | DEFB | 14D |
| 257 | 0188 | 62 | DEFB | 98D |
| 258 | 0189 | 1C | DEFB | 28D |
| 259 | 018A | 54 | DEFB | 84D |
| 260 | 018B | 2A | DEFB | 42D |
| 261 | 018C | 46 | DEFB | 70D |
| 262 | 018D | 38 | DEFB | 56D |
| 263 | 018E | 38 | DEFB | 56D |
| 264 | 018F | 46 | DEFB | 70D |
| 265 | 0190 | 2A | DEFB | 42D |
| 266 | 0191 | 54 | DEFB | 84D |
| 267 | 0192 | 1C | DEFB | 28D |
| 268 | 0193 | 62 | DEFB | 98D |
| 269 | 0194 | 0E | DEFB | 14D |
| 270 | 0195 | 70 | DEFB | 112D |
| 271 | 0196 | 01 | DEFB | 1D |
| 272 | 0197 | 09 | DEFB | 9D |
| 273 | 0198 | 3E | DEFB | 62D |
| 274 | 0199 | 12 | DEFB | 18D |
| 275 | 019A | 35 | DEFB | 53D |
| 276 | 019B | 1B | DEFB | 27D |
| 277 | 019C | 2C | DEFB | 44D |
| 278 | 019D | 24 | DEFB | 36D |
| 279 | 019E | 24 | DEFB | 36D |
| 280 | 019F | 2C | DEFB | 44D |
| 281 | 01A0 | 1B | DEFB | 27D |
| 282 | 01A1 | 35 | DEFB | 53D |
| 283 | 01A2 | 12 | DEFB | 18D |
| 284 | 01A3 | 3E | DEFB | 62D |
| 285 | 01A4 | 09 | DEFB | 9D |
| 286 | 01A5 | 47 | DEFB | 71D |
| 287 | 01A6 | 01 | DEFB | 1D |
| 288 | 01A7 | 07 | DEFB | 7D |
| 289 | 01A8 | 2E | DEFB | 46D |
| 290 | 01A9 | 0E | DEFB | 14D |
| 291 | 01AA | 28 | DEFB | 40D |
| 292 | 01AB | 14 | DEFB | 20D |
| 293 | 01AC | 21 | DEFB | 33D |
| 294 | 01AD | 18 | DEFB | 27D |
| 295 | 01AE | 18 | DEFB | 27D |
| 296 | 01AF | 20 | DEFB | 32D |
| 297 | 01B0 | 14 | DEFB | 20D |
| 298 | 01B1 | 28 | DEFB | 40D |
| 299 | 01B2 | 0E | DEFB | 14D |
| 300 | 01B3 | 2E | DEFB | 46D |
| 301 | 01B4 | 07 | DEFB | 7D |
| 302 | 01B5 | 35 | DEFB | 53D |
| 303 | 01B6 | 01 | DEFB | 1D |
| 304 | 01B7 | 07 | DEFB | 7D |
| 305 | 01B8 | 2C | DEFB | 44D |
| 306 | 01B9 | 0D | DEFB | 13 |
| 307 | 01BA | 25 | DEFB | 37 |
| 308 | 01BB | 13 | DEFB | 19D |
| 309 | 01BC | 1F | DEFB | 31D |
| 310 | 01BD | 19 | DEFB | 25D |
| 311 | 01BE | 19 | DEFB | 25D |
| 312 | 01BF | 1F | DEFB | 31D |
| 313 | 01C0 | 13 | DEFB | 19D |
| 314 | 01C1 | 35 | DEFB | 37D |
| 315 | 01C2 | 0D | DEFB | 13D |
| 316 | 01C3 | 2B | DEFB | 43D |
| 317 | 01C4 | 07 | DEFB | 7D |
| 318 | 01C5 | 32 | DEFB | 50D |
| 319 | 01C6 | 01 | DEFB | 1D |
| 320 | 01C7 | 06 | DEFB | 6D |
| 321 | 01C8 | 24 | DEFB | 36D |
| 322 | 01C9 | 0B | DEFB | 11D |
| 323 | 01CA | 1F | DEFB | 31D |
| 324 | 01CB | 10 | DEFB | 16D |
| 325 | 01CC | 1A | DEFB | 26D |
| 326 | 01CD | 15 | DEFB | 21D |
| 327 | 01CE | 15 | DEFB | 21D |
| 328 | 01CF | 1A | DEFB | 26D |
| 329 | 01D0 | 10 | DEFB | 16D |
| 330 | 01D1 | 1F | DEFB | 31D |
| 331 | 01D2 | DB | DEFB | 11D |
| 332 | 01D3 | 24 | DEFB | 36D |
| 333 | 01D4 | 06 | DEFB | 6D |
| 334 | 01D5 | 29 | DEFB | 41D |

TABLE 3-continued

| | | | | | | | | |
|---|---|---|---|---|---|---|---|---|
| 335 | 01D6 | 01 | | | | | DEFB | 1D |
| 336 | 01D7 | 05 | | | | | DEFB | 5D |
| 337 | 01D8 | 1F | | | | | DEFB | 31D |
| 338 | 01D9 | 09 | | | | | DEFB | 9D |
| 339 | 01DA | 1A | | | | | DEFB | 26D |
| 340 | 01DB | 0D | | | | | DEFB | 13D |
| 341 | 01DC | 16 | | | | | DEFB | 22D |
| 342 | 01DD | 12 | | | | | DEFB | 18D |
| 343 | 01DE | 12 | | | | | DEFB | 18D |
| 344 | 01DF | 16 | | | | | DEFB | 22D |
| 345 | 01EO | 0D | | | | | DEFB | 13D |
| 346 | 01E1 | 1A | | | | | DEFB | 26D |
| 347 | 01E2 | 09 | | | | | DEFB | 9D |
| 348 | 01E3 | 1E | | | | | DEFB | 30D |
| 349 | 01E4 | 05 | | | | | DEFB | 5D |
| 350 | 01E5 | 23 | | | | | DEFB | 35D |
| 351 | 01E6 | 01 | | | | | DEFB | 1D |
| 352 | 01E7 | 04 | | | | | DEFB | 4D |
| 353 | 01E3 | 16 | | | | | DEFB | 22D |
| 354 | 01E9 | 07 | | | | | DEFB | 7D |
| 355 | 01EA | 13 | | | | | DEFB | 19D |
| 356 | 01EB | 0A | | | | | DEFB | 10D |
| 357 | 01EC | 10 | | | | | DEFB | 16D |
| 358 | 01ED | 0D | | | | | DEFB | 13D |
| 359 | 01EE | 0D | | | | | DEFB | 13D |
| 360 | 01EF | 10 | | | | | DEFB | 160 |
| 361 | 01F0 | 0A | | | | | DEFB | 10D |
| 362 | 01F1 | 13 | | | | | DEFB | 19D |
| 363 | 01F2 | 07 | | | | | DEFB | 7D |
| 364 | 01F3 | 16 | | | | | DEFB | 22D |
| 365 | 01F4 | 04 | | | | | DEFB | 4D |
| 366 | 01F5 | 19 | | | | | DEFB | 25D |
| 367 | 01F6 | 01 | | | | | DEFB | 1D |
| 368 | 01F7 | FD | 21 | 00 | 10 | SAMPLE | LD | IY,1000H |
| 369 | 01F8 | 21 | FF | 3F | | | LD | HL,3FFFH |
| 370 | 01FE | FD | 46 | 00 | | | LD | B,(IY) |
| 371 | 0201 | DD | 21 | 00 | FF | SCF | LD | IX,OFF00H |
| 372 | 0205 | FD | 23 | | | | INC | IY |
| 373 | 0207 | 2B | | | | | DEC | HL |
| 374 | 0208 | 31 | 00 | 00 | | | LD | SP,0 |
| 375 | 020B | ED | 7A | | | | ADC | HL,SP |
| 376 | 020D | CA | F7 | 01 | | | JP | Z,SAMPLE |
| 377 | 0210 | 31 | 01 | 00 | | | LD | SP,1 |
| 378 | 0213 | FD | 7E | 00 | | | LD | A,(IY) |
| 433 | 0275 | 3D | | | | JJ | DEC | A |
| 434 | 0276 | C2 | 75 | 02 | | | JP | NZ,JJ |
| 435 | 0279 | DB | 02 | | | | IN | A,(2) |
| 436 | 027B | 3D | | | | | DEC | A |
| 437 | 027C | 3D | | | | | DEC | A |
| 438 | 027D | 3D | | | | | DEC | A |
| 439 | 027E | 3D | | | | | DEC | A |
| 440 | 027F | 3D | | | | | DEC | A |
| 441 | 0280 | CA | BE | 02 | | | JP | Z,NOUT |
| 442 | 0283 | 3E | FF | | | | LD | A,FFH |
| 443 | 0285 | 3D | | | | FF | DEC | A |
| 444 | 0286 | C2 | 85 | 02 | | | JP | NZ,FF |
| 445 | 0289 | 3E | FF | | | | LD | A,OFFH |
| 446 | 028B | 3D | | | | KK | DEC | A |
| 447 | 028C | C2 | 8B | 02 | | | JP | NZ,KK |
| 448 | 028F | 3E | 2C | | | | LD | A,2CH |
| 449 | 0291 | 3D | | | | LL | DEC | A |
| 450 | 0292 | C2 | 91 | 02 | | | JP | NZ,LL |
| 451 | 0295 | DB | 02 | | | | IN | A,(2) |
| 452 | 0297 | 3D | | | | | DEC | A |
| 453 | 0298 | 3D | | | | | DEC | A |
| 454 | 0299 | 3D | | | | | DEC | A |
| 455 | 029A | 3D | | | | | DEC | A |
| 456 | 029B | 3D | | | | | DEC | A |
| 457 | 029C | 3D | | | | | DEC | A |
| 458 | 029D | CA | BE | 02 | | | JP | Z,NOUT |
| 459 | 02A0 | 3E | FF | | | | LD | A, FFH |
| 460 | 02A2 | 3D | | | | GG | DEC | A |
| 461 | 02A3 | C2 | A2 | 02 | | | JP | NZ IGG |
| 462 | 02A6 | 3E | FF | | | | LD | A, FFH |
| 463 | 02A8 | 3D | | | | HH | DEC | A |
| 464 | 02A9 | C2 | AB | 02 | | | JP | NZ HH |
| 465 | 02AC | 3E | FF | | | LD | A,OFFH | |
| 466 | 02AE | 3D | | | | NN | DEC | A |
| 467 | 02AF | C2 | AE | 02 | | | JP | NZ,NN |
| 468 | 02B2 | 3E | FF | | | | LD | A,OFFH |
| 469 | 02B4 | 3D | | | | PP | DEC | A |
| 470 | 02B5 | C2 | B4 | 02 | | | JP | NZ PP |

TABLE 3-continued

| | | | | | | | |
|---|---|---|---|---|---|---|---|
| 471 | 02B8 | 3E | 5E | | | LD | A, EH |
| 472 | 02BA | 3D | | | QQ | DEC | A |
| 473 | 02BB | C2 | BA | 02 | | JP | NZ, QQ |
| 474 | 02BE | 78 | | | NOUT | LD | A,B |
| 475 | 02BF | D3 | 10 | | | OUT | (10H),A |
| 476 | 02C1 | DD | 39 | | | ADD | IX,SP |
| 477 | 02C3 | DA | 01 | 02 | | JP | C,GOZ |
| 478 | 02C6 | C3 | 23 | 02 | | JP | ADD |
| 479 | 02C9 | ED | 44 | | NEG | NEG | |
| 480 | 02CB | CB | 20 | | | SLA | B |
| 481 | 02CD | 0E | 00 | | | LD | C,O |
| 482 | 02CF | 5F | | | | LD | E,A |
| 483 | 02D0 | 78 | | | ADDNEG | LD | A,E |
| 484 | 02D1 | 81 | | | | ADD | A,C |
| 485 | 02D2 | D2 | D6 | 02 | | JP | NC,NBYNEG |
| 486 | 02D5 | 05 | | | | DEC | B |
| 487 | 02D6 | 4F | | | NBYNEG | LD | C,A |
| 488 | 02D7 | 00 | | | | NOP | |
| 489 | 02D8 | D2 | DC | 02 | | JP | NC,NCYNEG |
| 490 | 02DB | 05 | | | | DEC | B |
| 491 | 02DC | 4F | | | NCYNEG | LD | C,A |
| 492 | 02DD | DB | 02 | | LOOPNG | IN | A,(2) |
| 493 | 02DF | 3C | | | | INC | A |
| 494 | 02E0 | 3D | | | | DEC | A |
| 495 | 02E1 | CA | 6B | 03 | | JP | Z,NEGOUT |
| 496 | 02E4 | 3E | 03 | | | LD | A,3H |
| 497 | 02E6 | 3D | | | AAA | DEC | A |
| 498 | 02E7 | C2 | E6 | 02 | | JP | NZ,AAA |
| 499 | 02EA | DB | 02 | | | IN | A,(2) |
| 500 | 02EC | 3D | | | | DEC | A |
| 501 | 02ED | CA | 68 | 03 | | JP | A,NEGOUT |
| 502 | 02F0 | 3E | 08 | | | LD | A,BH |
| 503 | 02F2 | 3D | | | BBB | DEC | A |
| 504 | 02F3 | C2 | F2 | 02 | | JP | NZ,BBB |
| 505 | 02F6 | DB | 02 | | | IN | A,(2) |
| 506 | 02F8 | 3D | | | | DEC | A |
| 507 | 02F9 | 3D | | | | DEC | A |
| 508 | 02FA | CA | 68 | 03 | | JP | Z,NEGOUT |
| 509 | 02FD | 3E | 14 | | | LD | A,14H |
| 510 | 02FF | 3D | | | CCC | DEC | A |
| 511 | 0300 | C2 | FF | 02 | | JP | NZ,CCC |
| 512 | 0303 | DB | 02 | | | IN | A,(2) |
| 513 | 0305 | 3D | | | | DEC | A |
| 514 | 0306 | 3D | | | | DEC | A |
| 515 | 0307 | 3D | | | | DEC | A |
| 516 | 0308 | CA | 6B | 03 | | JP | A,NEGOUT |
| 517 | 030B | 3E | 2D | | | LD | A,2DH |
| 518 | 030D | 3D | | | DDD | DEC | A |
| 519 | 030E | C2 | 0D | 0D | | JP | NZ,DDD |
| 520 | 0311 | DB | 02 | | | IN | A,(2) |
| 521 | 0313 | 3D | | | | DEC | A |
| 522 | 0314 | 3D | | | | DEC | A |
| 523 | 0315 | 3D | | | | DEC | A |
| 524 | 0316 | 3D | | | | DEC | A |
| 525 | 0317 | CA | 6B | 03 | | JP | Z,NEGOUT |
| 526 | 031A | 3E | FF | | | LD | A,OFFH |
| 527 | 031C | 3D | | | EEE | DEC | A |
| 528 | 031D | C2 | 1C | 03 | | JP | NZ,EEE |
| 529 | 0320 | 3E | CE | | | LD | A,OCEH |
| 530 | 0322 | 3D | | | JJJ | DEC | A |
| 531 | 0323 | C2 | 22 | 03 | | JP | NZ,JJJ |
| 532 | 0326 | DB | 02 | | | IN | A,(2) |
| 533 | 0328 | 3D | | | | DEC | A |
| 534 | 0329 | 3D | | | | DEC | A |
| 535 | 032A | 3D | | | | DEC | A |
| 536 | 032B | 3D | | | | DEC | A |
| 537 | 032C | 3D | | | | DEC | A |
| 538 | 032D | CA | 6B | 03 | | JP | Z,NEGOUT |
| 539 | 0330 | 3E | FF | | | LD | A,OFFH |
| 540 | 0332 | 3D | | | FFF | DEC | A |
| 541 | 0333 | C2 | 32 | 03 | | JP | NZ,FFF |
| 542 | 0336 | 3E | FF | | | LD | A,OFFH |
| 543 | 0338 | 3D | | | KKK | DEC | A |
| 544 | 0339 | C2 | 38 | 03 | | JP | NZ,KKK |
| 545 | 033C | 3E | 2C | | | LD | A,2CH |
| 546 | 033E | 3D | | | LLL | DEC | A |
| 547 | 033F | C2 | 3E | 03 | | JP | NZ,LLL |
| 548 | 0342 | DB | 02 | | | IN | A,(2) |
| 549 | 0344 | 3D | | | | DEC | A |
| 550 | 0345 | 3D | | | | DEC | A |
| 551 | 0346 | 3D | | | | DEC | A |
| 552 | 0347 | 3D | | | | DEC | A |

TABLE 3-continued

| | | | | | | | |
|---|---|---|---|---|---|---|---|
| 553 | 0348 | 3D | | | | DEC | A |
| 554 | 0349 | 3D | | | | DEC | A |
| 555 | 034A | CA | 6B | 03 | | JP | A,NEGOUT |
| 556 | 034D | 3E | FF | | | LD | A,OFFH |
| 557 | 034F | 3D | | | GGG | DEC | A |
| 558 | 0350 | C2 | 4F | 03 | | JP | NZ,GGG |
| 559 | 0353 | 3E | FF | | | LD | A,OFFH |
| 560 | 0355 | 3D | | | HHH | DEC | A |
| 561 | 0356 | C2 | 55 | 03 | | JP | NZ,HHH |
| 562 | 0359 | 3E | FF | | | LD | A,OFFH |
| 563 | 035B | 3D | | | NNN | DEC | A |
| 564 | 0350 | C2 | 5B | 03 | | JP | NZ,NNN |
| 565 | 035F | 3E | FF | | | LD | A,OFFH |
| 566 | 0361 | 3D | | | PPP | DEC | A |
| 567 | 0362 | C2 | 61 | 03 | | JP | NZ,PPP |
| 568 | 0365 | 3E | 5E | | | LD | A,5EH |
| 569 | 0367 | 3D | | | QQQ | DEC | A |
| 570 | 0368 | C2 | 67 | 03 | | JP | NZ,QQQ |
| 571 | 036B | 78 | | | NEGOUT | LD | A,B |
| 572 | 036C | D3 | 10 | | | OUT | (10H),A |
| 573 | 036E | DD | 39 | | | ADD | IX,SP |
| 574 | 0370 | DA | 01 | 02 | | JP | C,GOZ |
| 575 | 0373 | C3 | D0 | 02 | | JP | ADDNEG |
| 576 | 0376 | | | | | END | |

ASSEMBLER ERRORS = 0
K/WESTINGHOUSE Z80 ASSEMBLER EC-02 VER. DATE 10/5/83 TIME OFF 15

CROSS REFERENCE

| LABEL | | VALUE | REFERENCE |
|---|---|---|---|
| AA | | 0239 | −400 |
| AAA | | 02E6 | −497 |
| ADD | | 0223 | −386 |
| ADDNEG | | 0200 | −483 |
| BB | | 0245 | −406 |
| BBB | | 02F2 | −503 |
| CC | | 0252 | −413 |
| CCC | | 02FF | −510 |
| CHUZ | | 0079 | −59 |
| DD | | 0260 | −421 |
| DDD | | 030D | −513 |
| EE | | 026F | −430 |
| EEE | | 031C | −527 |
| FF | | 0285 | −443 |
| FFF | | 0332 | −540 |
| GG | | 02A2 | −460 |
| GGG | | 034F | −557 |
| GO | | 0048 | −33 |
| GOZ | | 0201 | −371 |
| H | | 02A8 | −463 |
| HHH | | 0355 | −560 |
| JJ | | 0275 | −433 |
| JJJ | | 0322 | −530 |
| KK | | 0288 | −446 |
| KKK | | 0338 | −543 |
| LL | | 0291 | −449 |
| LLL | | 033E | −546 |
| LOOP | | 005F | −43 |
| LOOPNG | | 02DD | −492 |
| LOOPZ | | 0230 | −395 |
| MEMORY | M | 0000 | 0 |
| NBARRY | | 0229 | −390 |
| NBYNEG | | 02D6 | −487 |
| NCARRY | | 022F | −394 |
| NCYNEG | | 02DC | −491 |
| NEG | | 0209 | −479 |
| NEGOUT | | 036B | −571 |
| NEXT | | 005C | −47 |
| NN | | 02AE | −466 |
| NNN | | 035B | −563 |
| NOUT | | 02BE | −474 |
| ODB | | 0034 | −31 |
| OUT | | 0066 | −51 |
| POS | | 021E | −383 |
| PP | | 0284 | −469 |
| PPP | | 0361 | −566 |
| QQ | | 02BA | −472 |
| QQQ | | 0367 | −569 |
| RNDM | | 0024 | −26 |
| SAMPLE | | 01F7 | −363 |
| SINE | | 0038 | −34 |
| SKIP | | 0052 | −43 |
| SL1 | | 0146 | −200 |

TABLE 3-continued

| | | | |
|---|---|---|---|
| SL2 | | 0145 | −199 |
| SL3 | | 0157 | −211 |
| SL4 | | 0156 | −210 |
| SL5 | | 0140 | −196 |
| SOW | | 011C | −178 |
| STACK | S | 0000 | 0 |
| START | | 000A | −13 |
| SWL | | 0091 | −69 |
| SWL1 | | 00CB | −120 |
| SWL2 | | 0086 | −64 |
| SWP | | 0083 | −63 |
| TBL1 | | 015F | −216 |
| TBL2 | | 0167 | −224 |
| TBL3 | | 016F | −232 |
| TBL4 | | 0177 | −240 |
| TL1 | | 010F | −170 |
| TL2 | | 010A | −167 |
| TL3 | | 0104 | −163 |
| TL4 | | 00FD | −159 |
| TL5 | | 0117 | −175 |
| TL6 | | 0111 | −171 |
| TRW | | 00EE | −152 |

Other important areas in which the microprocessor-controlled RF modulator apparatus may be used are in developing NCTR algorithms and sideband/sidelobe track processing. Any periodic waveform that can be represented by a series of points (typically 1K or 2K of discrete quanta levels) can be accessed, read and used to modulate a testbench-generated target return. Engine sideband data, NCTR (Non-conforming target recognition) data and any irregular X-band returns of any type can be simulated easily, using existing hardware, with all modifications reserved to the executive algorithm and/or tables of programmed software.

Although the invention has been described with reference to a particular embodiment, it will be understood to those skilled in the art that the invention is capable of a variety of alternative embodiments within the spirit and scope of the appended claims.

What is claimed is:

1. A microprocessor-controlled RF modulator apparatus for testing a fire control radar comprising in combination:

means for processing digital data which is operated by a four MHz clock means, said processing means utilizing said digital data to generate a digital target return signal, memory means for storing a predetermined amount of digital data, said memory means being eraseable and programmable, said memory means being operatively connected to said processing means, input port means for selecting a test target return signal, said input port means operatively connected to said processing means, means for converting said digital target return signal to a analog target return modulating signal, said converting means being operatively connected to said processing means, and, means for attenuating operatively connected to said converting means to receive said analog target return modulating signal therefrom, said attenuating means receiving an RF signal, said attenuating means in response to said analog target return modulating signal modulates said RF signal to provide a modulated test target return signal.

2. A microprocessor-controlled RF modulator apparatus as described in claim 1 wherein memory means comprises a 20K EPROM memory unit.

3. A microprocessor-controlled RF modulator apparatus as described in claim 1 wherein said converting means comprises an output latch means operatively connected to said processing means, said output latch means buffering data into and out of said processing means, a digital to analog converter means operatively connected to said output latch means to receive data therefrom, said digital to analog converter means converting said data to an analog signal, and, an amplitude control means operatively connected to said digital to analog converter means to receive said analog signal therefrom, said amplitude control means generating control voltage which is applied to said attenuating means to control the output signal therefrom.

4. A microprocessor-controlled RF modulator apparatus as described in claim 1 wherein said attenuating means comprises a PIN diode attenuator.

5. A microprocessor-controlled RF modulator apparatus as described in claim 1 further including an RF target generator to provide an RF signal to said microprocessor-controlled RF modulator apparatus, said test target return signal from said attenuating means being applied to an RF target horn, said RF target horn radiating said test target return signal to a fire control radar which is under test.

6. A microprocessor-controlled RF modulator apparatus as described in claim 2 wherein said 20K EPROM memory unit comprises ten 2K EPROMS with their respective input lines connected in parallel and their respective output lines connected in parallel, both of which lines are respectively connected to said processing means.

7. A microprocessor-controlled RF modulator apparatus as described in claim 6 wherein said converting means comprises an output latch means operatively connected to said processing means, said ouput latch means buffering data into and out of said processing means, a digital to analog converter means operatively connected to said output latch means to receive data therefrom, said digital to analog converter means converting said data to an analog signal, an amplitude control means operatively connected to said digital to analog converter means to receive said analog signal therefrom, said amplitude control means generating control voltage which is applied to said attenuating means to control the output signal therefrom, and, said attenuating means comprises a PIN diode attenuator.

* * * * *